United States Patent
Fukuyo et al.

(10) Patent No.: US 7,489,454 B2
(45) Date of Patent: Feb. 10, 2009

(54) LASER PROCESSING DEVICE

(75) Inventors: Fumitsugu Fukuyo, Hamamatsu (JP); Kenshi Fukumitsu, Hamamatsu (JP); Tetsuya Osajima, Hamamatsu (JP)

(73) Assignee: Hamamatsu Photonics K.K., Hamamastsu-shi, Shizuoka (JP)

( * ) Notice: Subject to any disclaimer, the term of this patent is extended or adjusted under 35 U.S.C. 154(b) by 356 days.

(21) Appl. No.: 10/537,511

(22) PCT Filed: Dec. 4, 2003

(86) PCT No.: PCT/JP03/15555

§ 371 (c)(1),
(2), (4) Date: Nov. 28, 2005

(87) PCT Pub. No.: WO2004/050291

PCT Pub. Date: Jun. 17, 2004

(65) Prior Publication Data

US 2006/0151443 A1    Jul. 13, 2006

(30) Foreign Application Priority Data

Dec. 5, 2002    (JP)    ............................. 2002-354234

(51) Int. Cl.
*G02B 9/00* (2006.01)
*B23K 26/06* (2006.01)
(52) U.S. Cl. .................. 359/740; 219/121.75
(58) Field of Classification Search ................ 359/738, 359/739, 740; 219/121.75
See application file for complete search history.

(56) References Cited

U.S. PATENT DOCUMENTS 4,861,964 A    8/1989    Sinohara 6,392,683 B1    5/2002    Hayashi ...................... 347/241

(Continued)

FOREIGN PATENT DOCUMENTS

EP    1 110 661    6/2001

(Continued)

OTHER PUBLICATIONS

Kiyotaka Miura et al., "Formation of Photo-Induced Structures in Glasses with Femtosecond Laser", Dai 42 Kai Proceedings of Laser Materials Processing Conference, Nov. 1997, pp. 105-111 (Including English-language abstract).

(Continued)

*Primary Examiner*—Scott J Sugarman
(74) *Attorney, Agent, or Firm*—Drinker Biddle & Reath LLP

(57) ABSTRACT

A laser processing apparatus which can suppress the positional fluctuation in light-converging point of laser light during laser processing is provided. On an optical path of laser light L1 connecting a beam expander 34 and a first light-transmitting hole 32 of a lens holder 29 to each other in a laser processing apparatus 20, a stop member 38 including a second light-transmitting hole 39 having the same diameter as that of the first light-transmitting hole 32 is disposed. Hence, the amount of laser light L1 cut by the surrounding part of the first light-transmitting hole 32 can substantially be eliminated, whereby the lens holder 29 can be prevented from being heated upon irradiation with the laser light L1. Also, even when the stop member 38 is heated by the laser light L1 cut by the surrounding part of the second light-transmitting hole 39, heat is prevented from being transmitted from the stop member 38 to the lens holder 29, since the stop member 38 is separated from the lens holder 29. Therefore, the positional fluctuation in light-converging point P1 of the laser light L1 during laser processing can be suppressed to a low level.

5 Claims, 13 Drawing Sheets

U.S. PATENT DOCUMENTS

| | | | |
|---|---|---|---|
| 7,151,788 B2 * | 12/2006 | Imakado et al. | 372/101 |
| 2004/0002199 A1 | 1/2004 | Fukuyo et al. | 438/460 |

FOREIGN PATENT DOCUMENTS

| | | |
|---|---|---|
| EP | 1 338 371 | 8/2003 |
| GB | 1087534 | 10/1967 |
| JP | 03-018979 | 1/1991 |
| JP | 05-212571 | 8/1993 |
| JP | 07-185862 | 7/1995 |
| JP | 08-099187 | 4/1996 |

OTHER PUBLICATIONS

Ken-ichi Hayashi, "Inner Glass Marking by Harmonics of Solid State Laser", Dai 45 Kai Proceedings of Laser Materials Processing Conference, Dec. 1998; pp. 23-28 (Including English-language abstract).

Tomokasu Sano et al., "Evolution of Processing Characteristics of Silicon With Picosecond Pulser Laser", Osaka University, Graduate School, Department of Technological Research, Apr. 2000, pp. 72-73 (Including English-language translation).

Shuji Takaoka, "Stealth Dicing, Its Principles and Features: A Technology Most Suitable for Dicing Very Thin Semiconductor Wafers", Sep. 2002, pp. 17-21 (Including English-language translation).

* cited by examiner

LASER PROCESSING DEVICE

TECHNICAL FIELD

The present invention relates to a laser processing apparatus for forming a modified region by multiphoton absorption within a wafer-like object to be processed.

BACKGROUND ART

Laser processing apparatus which perform processing such as fusion cutting by irradiating an object to be processed with laser light have conventionally been known. In general, this kind of laser processing apparatus includes a laser head provided with a condenser lens for converging laser light onto an object to be processed, whereas a light-transmitting hole is provided on the laser light entrance side of the laser head as an entrance pupil for allowing the laser light incident on the converging lens to have a fixed diameter (see, for example, Japanese Patent Application Laid-Open No. HEI 5-212571 and Japanese Utility Model Application Laid-Open No. HEI 3-18979).

DISCLOSURE OF THE INVENTION

In the laser processing apparatus mentioned above, laser light having a beam size greater than the entrance pupil diameter is emitted to the light-transmitting hole of the laser head, so that the laser light cut by a surrounding part of the light-transmitting hole heats the laser head, thereby heating the condenser lens. This yields a fear of the laser head and condenser lens expanding, and so forth, thereby changing the light-converging point position of laser light with respect to the object to be processed.

Such a change in light-converging point position becomes a particularly severe problem in laser processing in which a modified region is formed by multiphoton absorption within a wafer-like object to be processed. This is because there is a case where the laser light converging position is required to be controlled on the order of micrometers when a silicon wafer having a thickness of 100 μm or less is used as an object to be processed, for example.

In view of such circumstances, it is an object of the present invention to provide a laser processing apparatus which can suppress the positional fluctuation in laser light converging position during laser processing to a low level.

For achieving the above-mentioned object, the laser processing apparatus in accordance with the present invention is a laser processing apparatus for irradiating a wafer-like object to be processed with laser light while locating a light-converging point within the object so as to form a modified region by multiphoton absorption within the object, the apparatus comprising a beam expander for enlarging a beam size of the laser light emitted from a laser light source; a condenser lens for converging the laser light incident thereon by way of the beam expander into the object; and a lens holder holding the condenser lens and including a first light-transmitting hole for making the laser light incident on the condenser lens; wherein a stop member having a second light-transmitting hole for narrowing and transmitting the laser light is disposed on an optical path of the laser light connecting the beam expander and the first light-transmitting hole to each other and is separated from the lens holder.

In this laser processing apparatus, laser light having a beam size enlarged by the beam expander is emitted to the second light-transmitting hole of the stop member, so that the outer peripheral part of the laser light greater than the second light-transmitting hole is cut, whereby the laser light passes through the second light-transmitting hole while narrowing the beam size. The laser light having passed the second light-converging hole is emitted to the first light-transmitting hole of the lens holder, whereas the laser light having passed the first light-transmitting hole is converged by the condenser lens. The light-converging point is positioned within a wafer-like (i.e., thin, flat) object to be processed, so as to form a modified region by multiphoton absorption within the object. When a stop member is disposed on an optical path of laser light connecting the beam expander and the first light-transmitting hole to each other, the amount of laser light cut by the surrounding part of the first light-transmitting hole can be made smaller than that in the case where the laser light having a beam size enlarged by the beam expander is directly emitted to the first light-transmitting hole of the lens holder, whereby the heating of the lens holder by the cut laser light can be suppressed. Also, even when the stop member is heated by the part of laser light cut by the surrounding part of the second light-transmitting hole, heat is prevented from being transmitted from the stop member to the lens holder, since the stop member is separated from the lens holder. Therefore, the positional fluctuation in light-converging point of laser light mainly due to the heating of the lens holder during laser processing can be suppressed to a low level, whereby the modified region can be formed accurately at a predetermined position within the wafer-like object to be processed.

When the laser light emitted from the beam expander is substantially parallel light, it will be preferred if the second light-transmitting hole has a diameter not greater than that of the first light-transmitting hole. When the laser light emitted from the beam expander is completely parallel light, the diameter of laser light having passed the second light-transmitting hole of the stop member can be made equal to that of the first light-transmitting hole if the diameter of the second light-transmitting hole and that of the first light-transmitting hole are the same. When the laser light emitted from the beam expander is substantially parallel light but slightly expands, the laser light can hardly be incident on the surrounding part of the first light-transmitting hole if the diameter of the second light-transmitting hole is made smaller than that of the first light-transmitting hole in view of the expansion of the laser light. Hence, while allowing the condenser lens to exhibit its light-converging characteristic to the maximum, the amount of laser light cut by the surrounding part of the first light-transmitting hole can substantially be eliminated, whereby the heating of the lens holder can further be suppressed. Here, the substantially parallel light encompasses completely parallel light as well.

When the laser light source emits the laser light at a beam diameter $\phi_0$ and a divergence angle $2\theta_0$, and the beam expander enlarges the beam size of the laser light by a magnification M and emits the laser light at a divergence angle $2\theta_1$; assuming that $d_1$ is the distance between an exit part of the laser light source and an entrance part of the beam expander, $d_2$ is the distance between an exit part of the beam expander and an entrance opening of the second light-transmitting hole, and $d_3$ is the distance between the entrance opening of the second light-transmitting hole and an entrance opening of the first light-transmitting hole; and letting $\phi_L$ be the diameter of the first light-transmitting hole, and $\phi_S$ be the diameter of the second light-transmitting hole; it will be preferred if $\phi_L$ and $\phi_S$ satisfy the relationship of $$\frac{\phi_L\{M(\phi_0 + 2d_1\tan\theta_0) + 2d_2\tan\theta_1\}}{M(\phi_0 + 2d_1\tan\theta_0) + 2(d_2 + d_3)\tan\theta_1} \geq \phi_s.$$

When the laser light emitted from the beam expander is divergent light, the laser light can hardly be incident on the surrounding part of the first light-transmitting hole if the diameter $\phi_L$ of the first light-transmitting hole and the diameter $\phi_S$ of the second light-transmitting hole satisfy the above-mentioned relationship. Hence, the amount of laser light cut by the surrounding part of the first light-transmitting hole can substantially be eliminated, whereby the heating of the lens holder can further be suppressed.

When the laser light source emits the laser light at a beam diameter $\phi_0$ and a divergence angle $2\theta_0$, and the beam expander enlarges the beam size of the laser light by a magnification M and emits the laser light at a convergence angle $2\theta_1$; assuming that $d_1$ is the distance between an exit part of the laser light source and an entrance part of the beam expander, $d_2$ is the distance between an exit part of the beam expander and an entrance opening of the second light-transmitting hole, and $d_3$ is the distance between the entrance opening of the second light-transmitting hole and an entrance opening of the first light-transmitting hole; and letting $\phi_L$ be the diameter of the first light-transmitting hole, and $\phi_S$ be the diameter of the second light-transmitting hole, it will be preferred if $\phi_L$ and $\phi_S$ satisfy the relationship of $$\frac{\phi_L\{M(\phi_0 + 2d_1\tan\theta_0) - 2d_2\tan\theta_1\}}{M(\phi_0 + 2d_1\tan\theta_0) - 2(d_2 + d_3)\tan\theta_1} \geq \phi_s.$$

When the laser light emitted from the beam expander is convergent light, the laser light can hardly be incident on the surrounding part of the first light-transmitting hole if the diameter $\phi_L$ of the first light-transmitting hole and the diameter $\phi_S$ of the second light-transmitting hole satisfy the above-mentioned relationship. Hence, the amount of laser light cut by the surrounding part of the first light-transmitting hole can substantially be eliminated, whereby the heating of the lens holder can further be suppressed.

BEST MODES FOR CARRYING OUT THE INVENTION

In the following, a preferred embodiment of the laser processing apparatus in accordance with the present invention will be explained in detail with reference to the drawings.

The laser processing apparatus in accordance with this embodiment irradiates a wafer-like object to be processed while locating a light-converging point within the object, so as to form a modified region by multiphoton absorption within the object. Therefore, before explaining the laser processing apparatus in accordance with this embodiment, the forming of a modified region by the multiphoton absorption will be explained.

A material becomes transparent when its absorption bandgap $E_G$ is greater than photon energy hv. Hence, a condition under which absorption occurs in the material is $hv > E_G$. However, even when optically transparent, the material generates absorption under a condition of $nhv > E_G$ (where n=2, 3, 4, ...) if the intensity of laser light becomes very high. This phenomenon is known as multiphoton absorption. In the case of pulsed waves, the intensity of laser light is determined by the peak power density (W/cm$^2$) of laser light at a light-converging point. The multiphoton absorption occurs under a condition where the peak power density is $1 \times 10^8$ (W/cm$^2$) or greater, for example. The peak power density is determined by (energy of laser light at the light-converging point per pulse)/(beam spot cross-sectional area of laser light×pulse width). In the case of continuous waves, the intensity of laser light is determined by the field intensity (W/cm$^2$) of laser light at the light-converging point.

Figure 1:
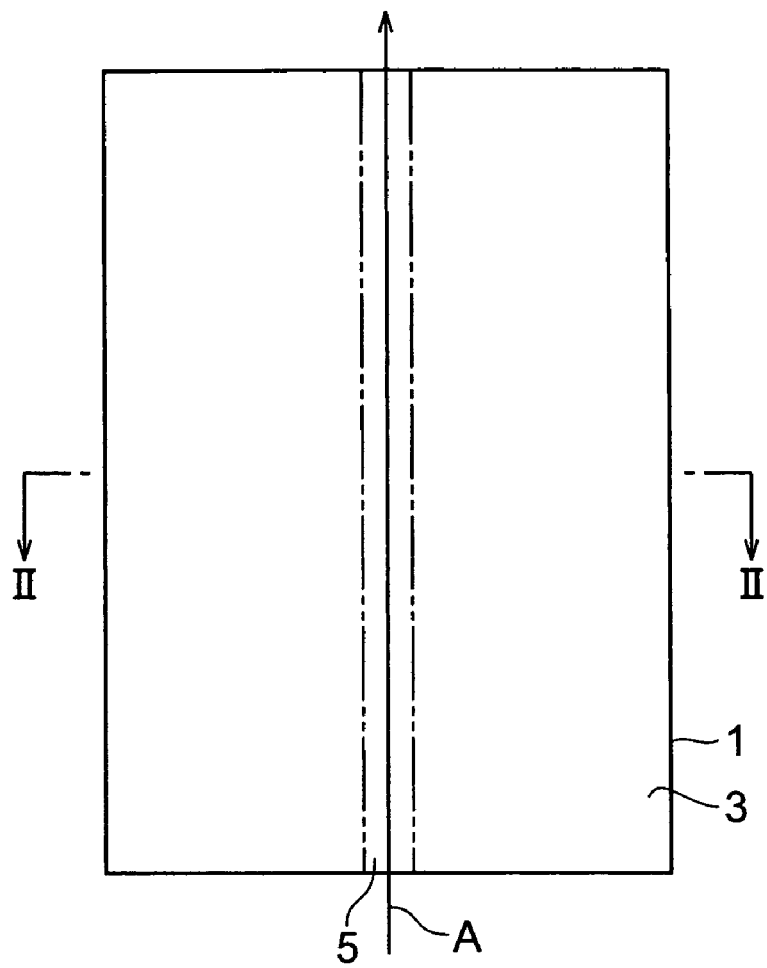
FIG. 1 is a plan view of an object to be processed during laser processing by the laser processing method in accordance with an embodiment.
Figure 2:
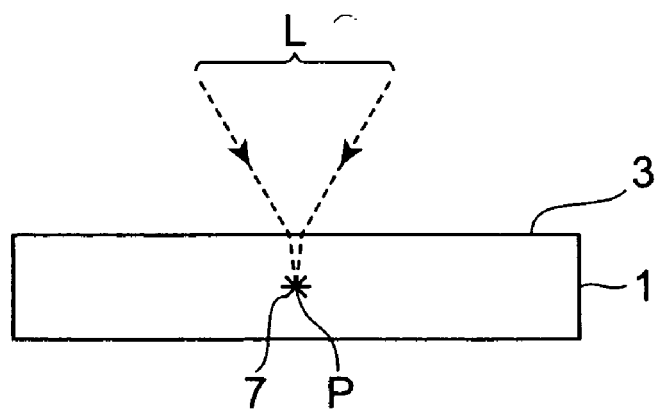
FIG. 2 is a sectional view of the object taken along the line II-II of FIG. 1.
Figure 3:
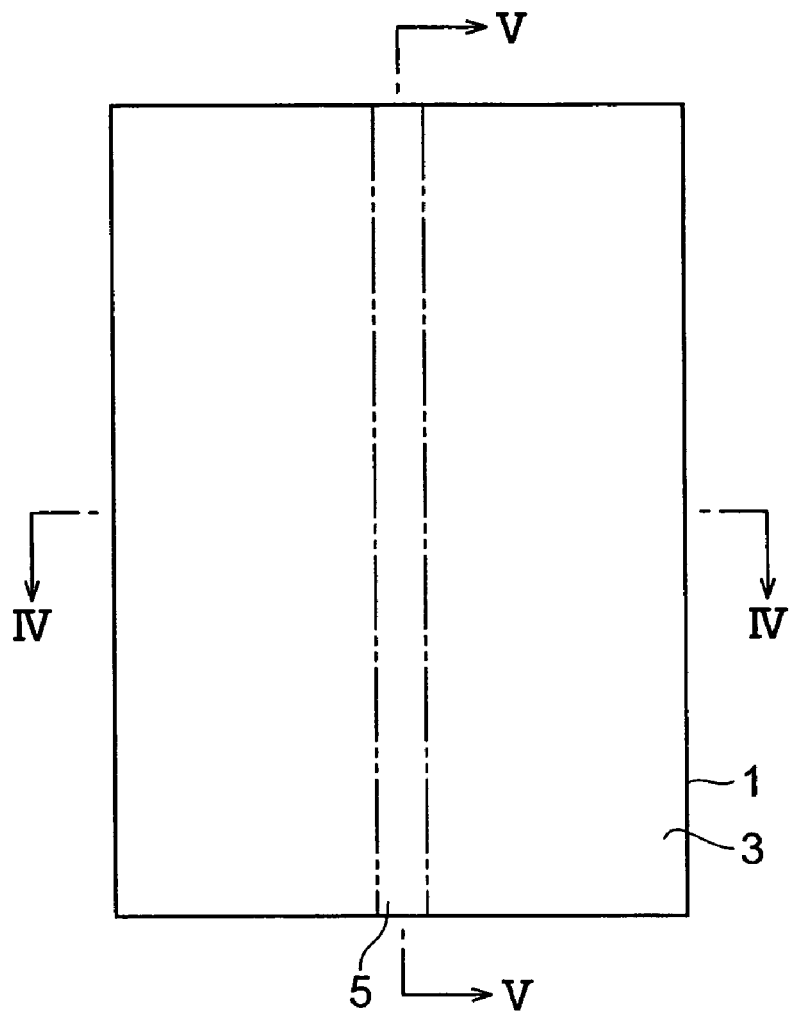
FIG. 3 is a plan view of the object after the laser processing by the laser processing method in accordance with the embodiment.
Figure 4:
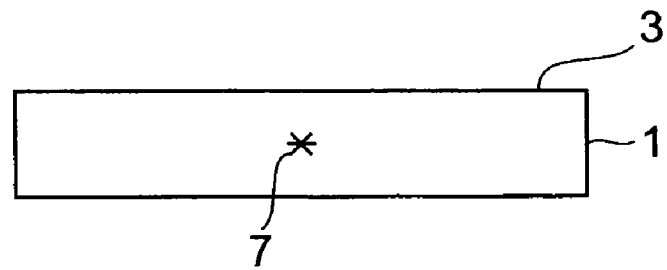
FIG. 4 is a sectional view of the object taken along the line IV-IV of FIG. 3.
Figure 5:
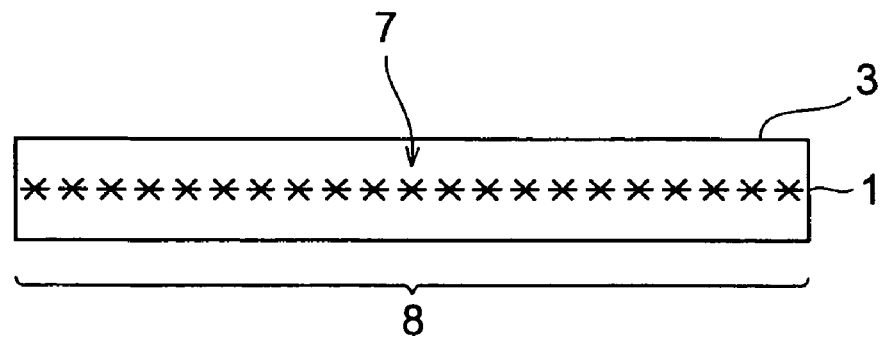
FIG. 5 is a sectional view of the object taken along the line V-V of FIG. 3.
Figure 6:
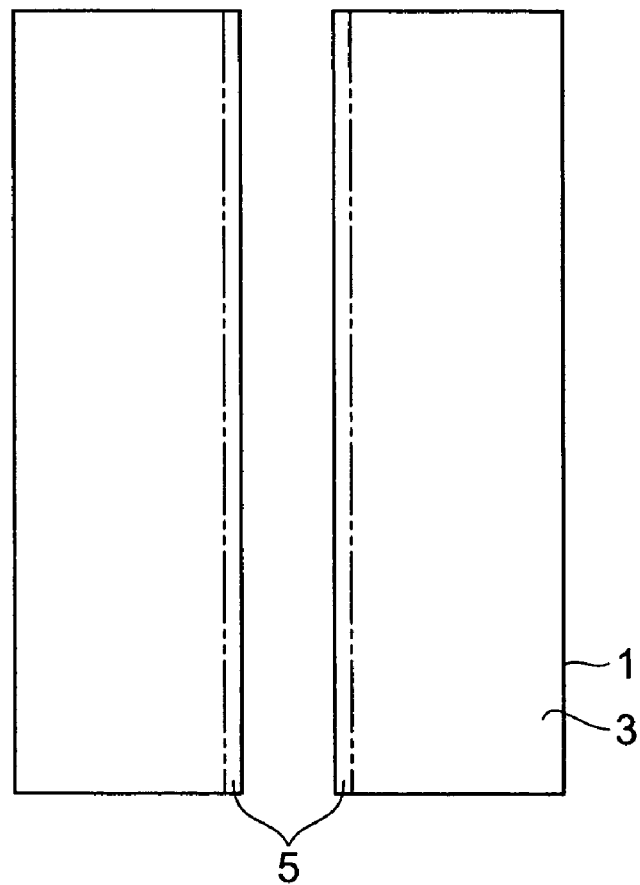
FIG. 6 is a plan view of the object cut by the laser processing method in accordance with the embodiment.

The principle of the laser processing method in accordance with the embodiment using such multiphoton absorption will be explained with reference to FIGS. 1 to 6. FIG. 1 is a plan view of an object to be processed 1 during laser processing. FIG. 2 is a sectional view of the object 1 taken along the line II-II of FIG. 1. FIG. 3 is a plan view of the object 1 after the laser processing. FIG. 4 is a sectional view of the object 1 taken along the line IV-IV of FIG. 3. FIG. 5 is a sectional view of the object taken along the line V-V of FIG. 3. FIG. 6 is a plan view of the cut object 1.

As shown in FIGS. 1 and 2, on a front face 3 of the object 1, a line to cut 5 for cutting the object 1 exists. The line to cut 5 is a virtual line extending straight (or a line may actually be drawn on the object 1 as the line to cut 5). The laser processing in accordance with this embodiment irradiates the object 1 with laser light L while locating a light-converging point P within the object 1 under a condition generating multiphoton absorption, so as to form a modified region 7. The light-converging point P is a position at which the laser light L is converged.

The laser light L is relatively moved along the line to cut 5 (i.e., in the direction of arrow A), so as to shift the light-converging point P along the line to cut 5. Consequently, as shown in FIGS. 3 to 5, the modified region 7 is formed along the line to cut 5 only within the object 1, whereas a part to cut 8 is formed by the modified region 7. In the laser processing method in accordance with this embodiment, the modified region 7 is not formed by the heat generated from the object 1 absorbing the laser light L. The laser light L is transmitted through the object 1, so as to generate multiphoton absorption therewithin, thereby forming the modified region 7. Therefore, the front face 3 of the object 1 hardly absorbs the laser light L and does not melt.

When a start point exists in a cutting part at the time of cutting the object 1, the object 1 fractures from the start point, whereby the object 1 can be cut with a relatively small force as shown in FIG. 6. Therefore, the object 1 can be cut without generating unnecessary fractures on the front face 3 of the object 1.

There seem to be the following two ways of cutting the object from the part to cut acting as a start point. The first case is where an artificial force is applied to the object after forming the part to cut, so that the object fractures from the part to cut, whereby the object is cut. This is the cutting in the case where the object has a large thickness, for example. Applying an artificial force refers to exerting a bending stress or shear stress to the object along the part to cut, or generating a thermal stress by applying a temperature difference to the object, for example. The other case is where the forming of the part to cut causes the object to fracture naturally in its cross-sectional direction (thickness direction) from the part to cut acting as a start point, thereby cutting the object. This becomes possible if the part to cut is formed by one row of the modified region when the object has a small thickness, or if the part to cut is formed by a plurality of rows of the modified region in the thickness direction when the object has a large thickness. Even in this naturally fracturing case, fractures do not extend onto the front face at a portion corresponding to an area not formed with the part to cut, so that only the portion corresponding to the area formed with the part to cut can be cleaved, whereby cleavage can be controlled well. Such a cleaving method with a favorable controllability is quite effective, since the object to be processed such as silicon wafer has recently been apt to decrease its thickness.

The modified region formed by multiphoton absorption in this embodiment encompasses the following cases (1) to (3):

(1) Case where the Modified Region is a Crack Region Including One Crack or a Plurality of Cracks An object to be processed (e.g., glass or a piezoelectric material made of $LiTaO_3$) is irradiated with laser light while locating a light-converging point therewithin under a condition with a field intensity of at least $1 \times 10^8$ (W/cm$^2$) at the light-converging point and a pulse width of 1 μs or less. This magnitude of pulse width is a condition under which a crack region can be formed only within the object while generating multiphoton absorption without causing unnecessary damages on the front face of the object. This generates a phenomenon of optical damage by multiphoton absorption within the object. This optical damage induces a thermal distortion within the object, thereby forming a crack region therewithin. The upper limit of field intensity is $1 \times 10^{12}$ (W/cm$^2$), for example. The pulse width is preferably 1 to 200 ns, for example. The forming of a crack region by multiphoton absorption is disclosed, for example, in "Internal Marking of Glass Substrate with Solid-state Laser", Proceedings of the 45th Laser Materials Processing Conference (December, 1998), pp. 23-28.

The inventors determined the relationship between field intensity and crack size by an experiment. The following are conditions of the experiment.

(A) Object to be processed: Pyrex (registered trademark) glass (with a thickness of 700 μm)

(B) Laser
  light source: semiconductor laser pumping Nd:YAG laser
  wavelength: 1064 nm
  laser light spot cross-sectional area: $3.14 \times 10^{-8}$ cm$^2$
  oscillation mode: Q-switched pulse
  repetition frequency: 100 kHz
  pulse width: 30 ns
  output: output<1 mJ/pulse
  laser light quality: $TEM_{00}$
  polarizing property: linear polarization (C) Condenser lens
  transmittance at a laser light wavelength: 60%

(D) Moving rate of the mounting table mounting the object: 100 mm/sec

The laser light quality of $TEM_{00}$ means that the light-converging characteristic is so high that convergence to about the wavelength of laser light is possible.

Figure 7:
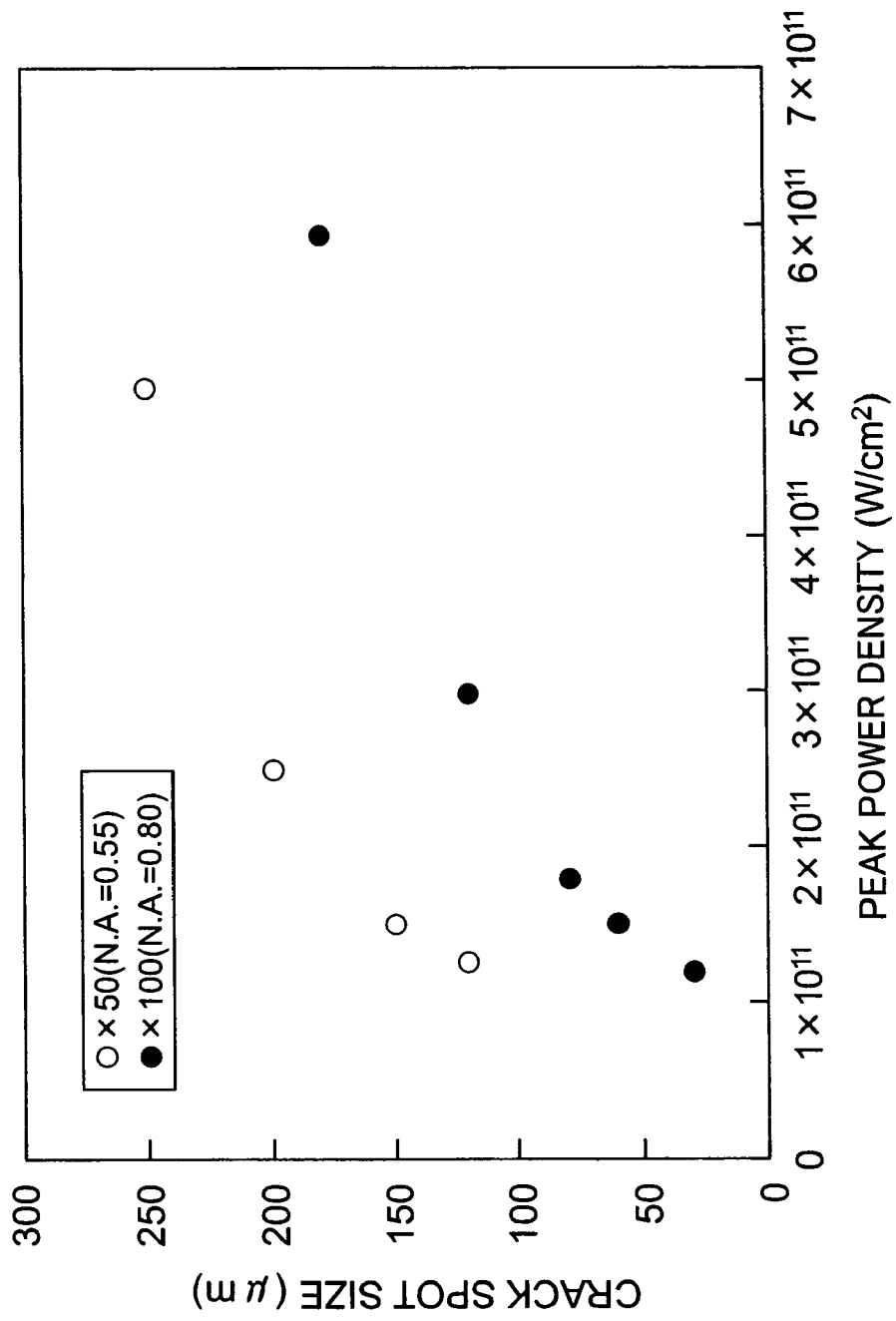
FIG. 7 is a graph showing relationships between the field intensity and crack spot size in the laser processing method in accordance with the embodiment.

FIG. 7 is a graph showing the results of the above-mentioned experiment. The abscissa indicates the peak power density. Since the laser light is pulsed laser light, the field intensity is represented by the peak power density. The ordinate indicates the size of a crack part (crack spot) formed within the object by one pulse of laser light. Crack spots gather to yield a crack region. The crack size is the size of a part yielding the maximum length among forms of crack spots. Data represented by black circles in the graph refer to a case where the condenser lens (C) has a magnification of ×100 and a numerical aperture (NA) of 0.80. On the other hand, data represented by whitened circles in the graph refer to a case where the condenser lens (C) has a magnification of ×50 and a numerical aperture (NA) of 0.55. Crack spots are seen to occur within the object from when the peak power density is about $10^{11}$ (W/cm$^2$) and become greater as the peak power density increases.

Figure 8:
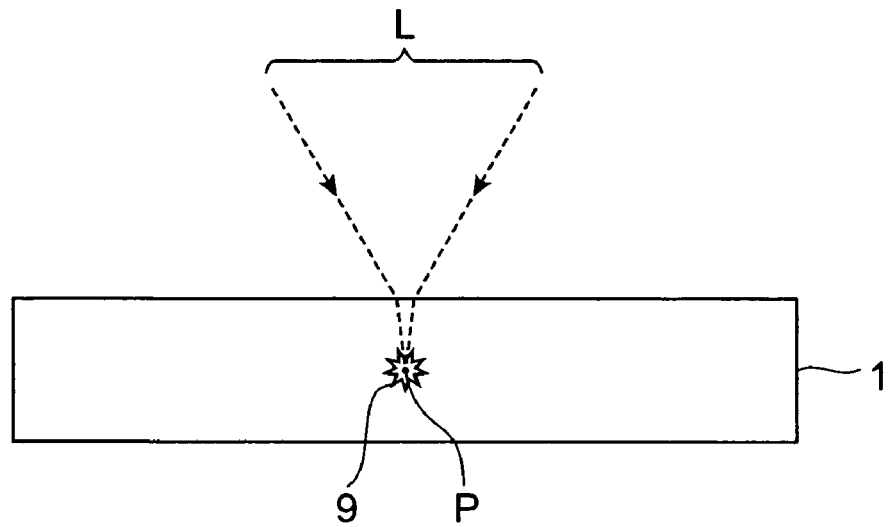
FIG. 8 is a sectional view of the object in a first step of the laser processing method in accordance with the embodiment.
Figure 9:
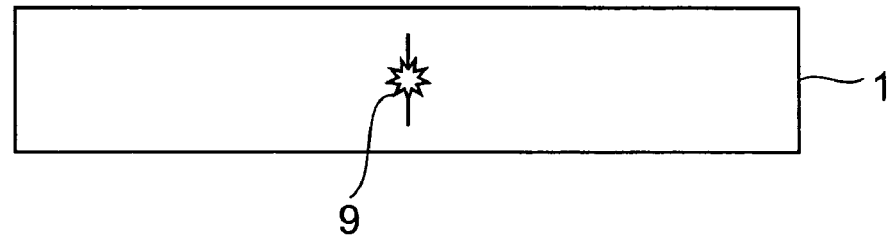
FIG. 9 is a sectional view of the object in a second step of the laser processing method in accordance with the embodiment.
Figure 10:
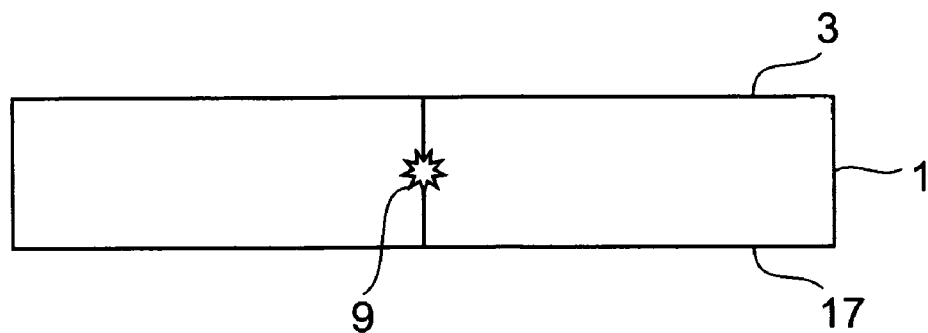
FIG. 10 is a sectional view of the object in a third step of the laser processing method in accordance with the embodiment.
Figure 11:
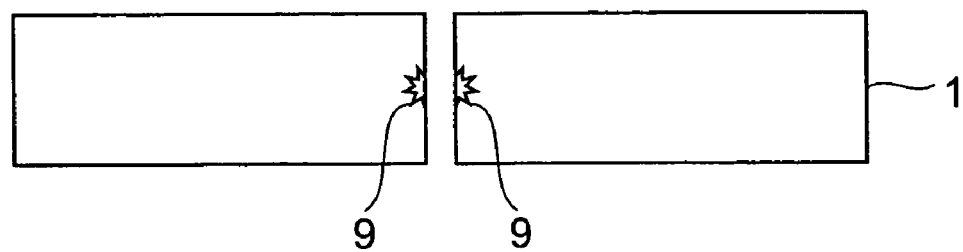
FIG. 11 is a sectional view of the object in a fourth step of the laser processing method in accordance with the embodiment.

A mechanism by which the object to be processed is cut by forming a crack region will now be explained with reference to FIGS. 8 to 11. As shown in FIG. 8, the object 1 is irradiated with laser light L while the light-converging point P is located within the object 1 under a condition where multiphoton absorption occurs, so as to form a crack region 9 therewithin along a line to cut. The crack region 9 is a region containing one crack or a plurality of cracks. The crack region 9 forms a part to cut. As shown in FIG. 9, a crack further grows from the crack region 9 acting as a start point (i.e., from the part to cut acting as a start point), and reaches the front face 3 and rear face 17 of the object 1 as shown in FIG. 10, whereby the object 1 fractures and is consequently cut as shown in FIG.

11. The crack reaching the front face 3 and rear face 17 of the object 1 may grow naturally or as a force is applied to the object 1.

(2) Case where the Modified Region is a Molten Processed Region

An object to be processed (e.g., semiconductor material such as silicon) is irradiated with laser light while locating a light-converging point within the object under a condition with a field intensity of at least $1 \times 10^8$ (W/cm$^2$) at the light-converging point and a pulse width of 1 µs or less. As a consequence, the inside of the object is locally heated by multiphoton absorption. This heating forms a molten processed region within the object. The molten processed region encompasses regions once molten and then re-solidified, regions just in a molten state, and regions in the process of being re-solidified from the molten state, and can also be referred to as a region whose phase has changed or a region whose crystal structure has changed. The molten processed region may also be referred to as a region in which a certain structure changes to another structure among monocrystal, amorphous, and polycrystal structures. For example, it means a region having changed from the monocrystal structure to the amorphous structure, a region having changed from the monocrystal structure to the polycrystal structure, or a region having changed from the monocrystal structure to a structure containing amorphous and polycrystal structures. When the object to be processed is of a silicon monocrystal structure, the molten processed region is an amorphous silicon structure, for example. The upper limit of field intensity is $1 \times 10^{12}$ (W/cm$^2$), for example. The pulse width is preferably 1 to 200 ns, for example.

By an experiment, the inventors verified that a molten processed region was formed within a silicon wafer. The following are conditions of the experiment.

(A) Object to be processed: silicon wafer (with a thickness of 350 µm and an outer diameter of 4 inches)

(B) Laser
light source: semiconductor laser pumping Nd:YAG laser
wavelength: 1064 nm
laser light spot cross-sectional area: $3.14 \times 10^{-8}$ cm$^2$
oscillation mode: Q-switched pulse
repetition frequency: 100 kHz
pulse width: 30 ns
output: 20 µJ/pulse
laser light quality: TEM$_{00}$
polarizing property: linear polarization (C) Condenser lens
magnification: ×50
N.A.: 0.55
transmittance at a laser light wavelength: 60%

(D) Moving rate of the mounting table mounting the object: 100 mm/sec

Figure 12:
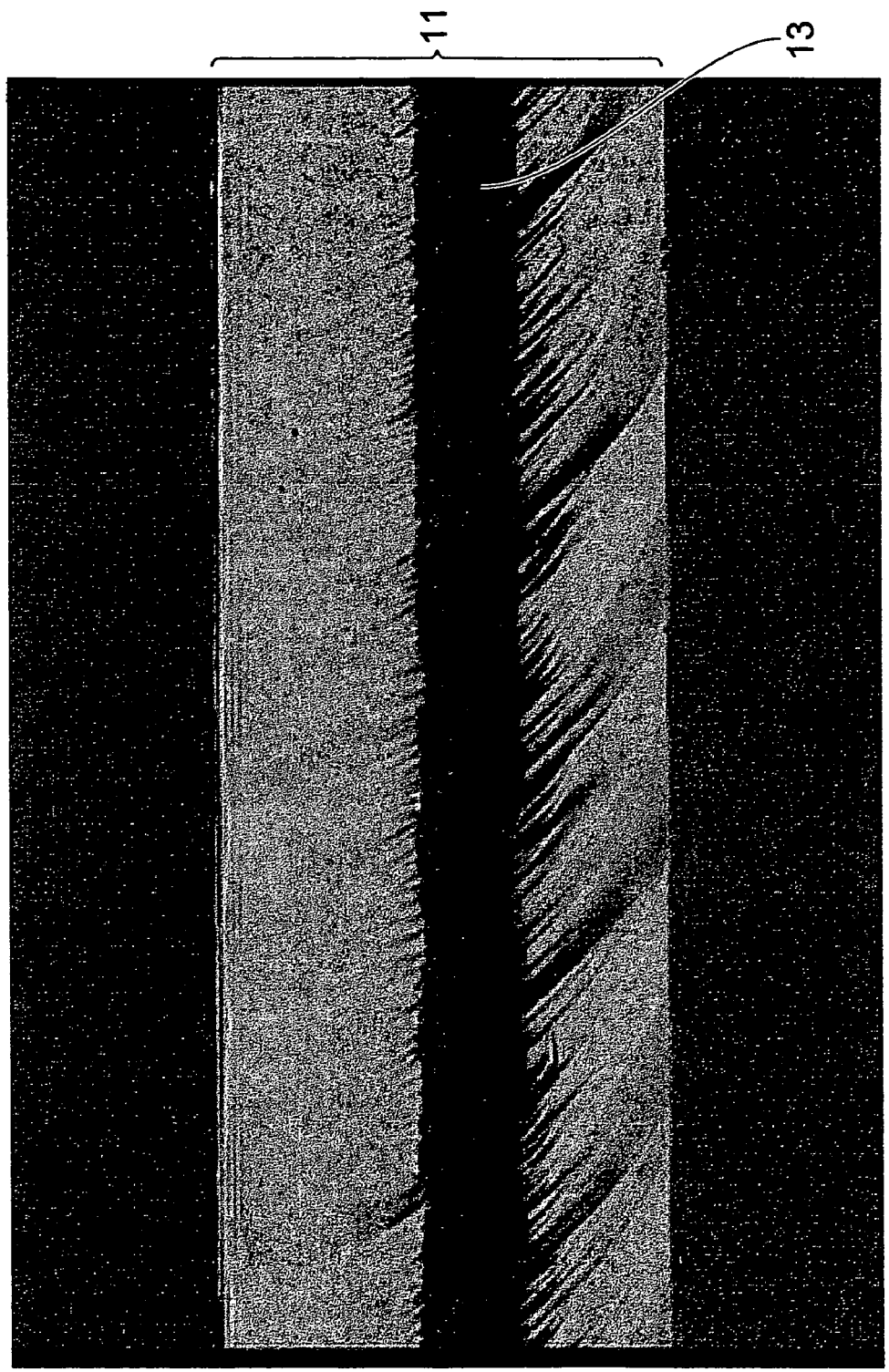
FIG. 12 is a view showing a photograph of a cross section of a part of a silicon wafer cut by the laser processing method in accordance with the embodiment.

FIG. 12 is a view showing a photograph of a cross section of a part of a silicon wafer cut by laser processing under the conditions mentioned above. A molten processed region 13 is formed within the silicon wafer 11. The molten processed region 13 formed under the above-mentioned conditions has a size of about 100 µm in the thickness direction.

Figure 13:
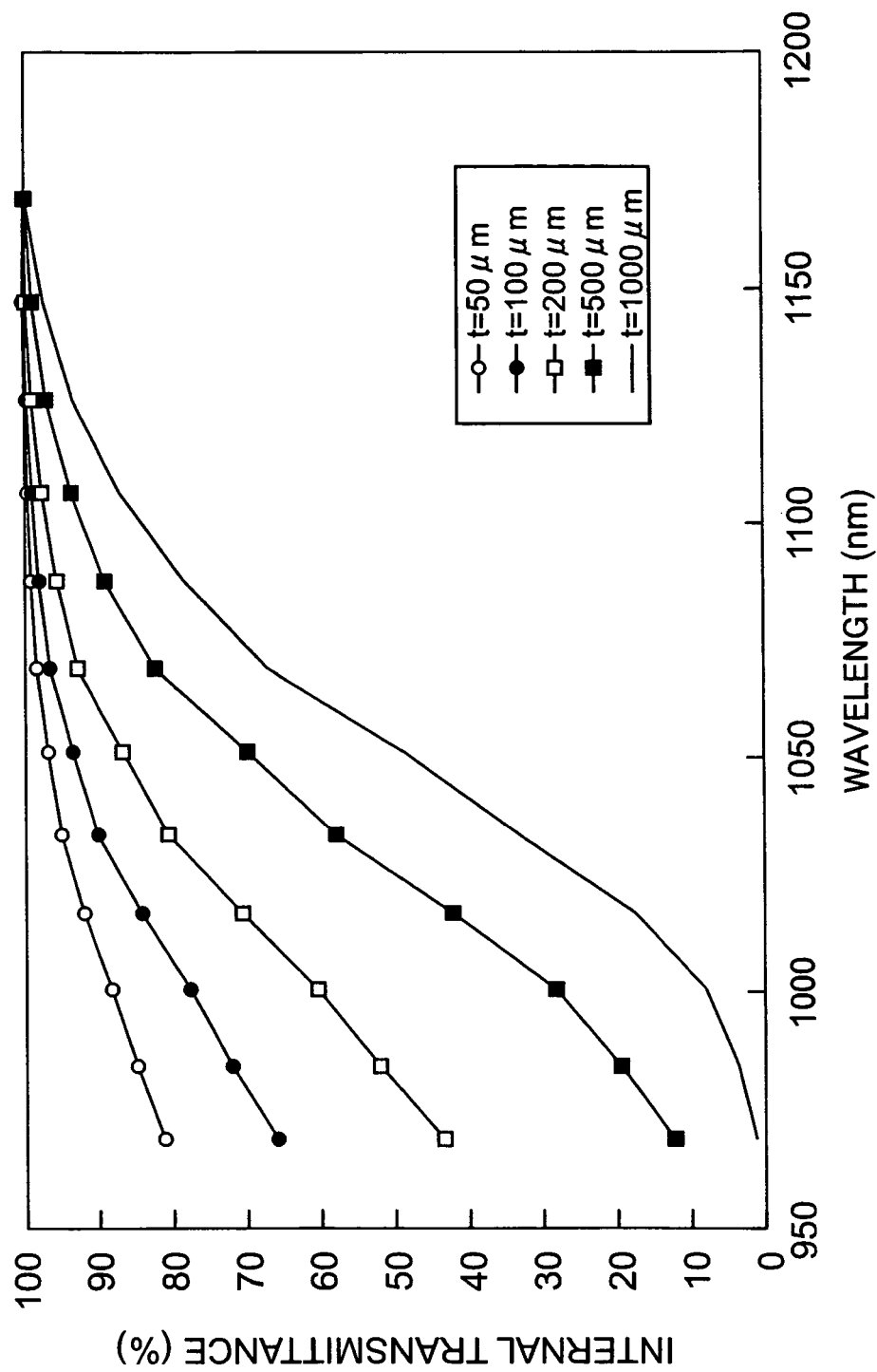
FIG. 13 is a graph showing relationships between the laser light wavelength and the transmittance within the silicon substrate in the laser processing method in accordance with the embodiment.

The fact that the molten processed region 13 is formed by multiphoton absorption will now be explained. FIG. 13 is a graph showing relationships between the laser light wavelength and the transmittance within the silicon substrate. Here, the respective reflected components on the front and rear sides of the silicon substrate are eliminated, so as to show the internal transmittance alone. The respective relationships are shown in the cases where the thickness t of the silicon substrate is 50 µm, 100 µm, 200 µm, 500 µm, and 1000 µm.

For example, at the Nd:YAG laser wavelength of 1064 nm, the laser light appears to be transmitted through the silicon substrate by at least 80% when the silicon substrate has a thickness of 500 µm or less. Since the silicon wafer 11 shown in FIG. 12 has a thickness of 350 µm, the molten processed region 13 caused by multiphoton absorption is formed near the center of the silicon wafer 11, i.e., at a part distanced from the front face by 175 µm. The transmittance in this case is 90% or more with reference to a silicon wafer having a thickness of 200 µm, whereby the laser light is absorbed only slightly within the silicon wafer 11 but is substantially transmitted therethrough. This means that the molten processed region 13 is formed within the silicon wafer 11 not by laser light absorption within the silicon wafer 11 (i.e., not by usual heating with the laser light) but by multiphoton absorption. The forming of a molten processed region by multiphoton absorption is disclosed, for example, in "Silicon Processing Characteristic Evaluation by Picosecond Pulse Laser", Preprints of the National Meetings of Japan Welding Society, Vol. 66 (April, 2000), pp. 72-73.

A fracture is generated in a silicon wafer from a part to cut formed by a molten processed region, acting as a start point, toward a cross section, and reaches the front and rear faces of the silicon wafer, whereby the silicon wafer is cut. The fracture reaching the front and rear faces of the silicon wafer may grow naturally or as a force is applied to the silicon wafer. The fracture naturally growing from the part to cut to the front and rear faces of the silicon wafer encompasses a case where the fracture grows from a state where the molten processed region forming the part to cut is molten and a case where the fracture grows when the molten processed region forming the part to cut is re-solidified from the molten state. In either case, the molten processed region is formed only within the silicon wafer, and thus is present only within the cut section after cutting as shown in FIG. 12. When a part to cut is formed within the object by a molten processed region as such, unnecessary fractures deviating from a part to cut line are harder to occur at the time of cleaving, whereby cleavage control becomes easier.

(3) Case where the Modified Region is a Refractive Index Change Region

An object to be processed (e.g., glass) is irradiated with laser light while locating a light-converging point within the object under a condition with a field intensity of at least $1 \times 10^8$ (W/cm$^2$) at the light-converging point and a pulse width of 1 ns or less. When multiphoton absorption is generated within the object with a very short pulse width, the energy caused by multiphoton absorption is not converted into thermal energy, whereby an eternal structure change such as ion valence change, crystallization, or orientation polarization is induced within the object, thus forming a refractive index change region. The upper limit of field intensity is $1 \times 10^{12}$ (W/cm$^2$), for example. The pulse width is preferably 1 ns or less, for example, more preferably 1 ps or less. The forming of a refractive index change region by multiphoton absorption is disclosed, for example, in "Forming of Photoinduced Structure within Glass by Femtosecond Laser Irradiation", Proceedings of the 42nd Laser Materials Processing Conference (November 1997), pp. 105-111.

The laser processing apparatus in accordance with this embodiment will now be explained with reference to FIGS. 14 and 15.

Figure 14:
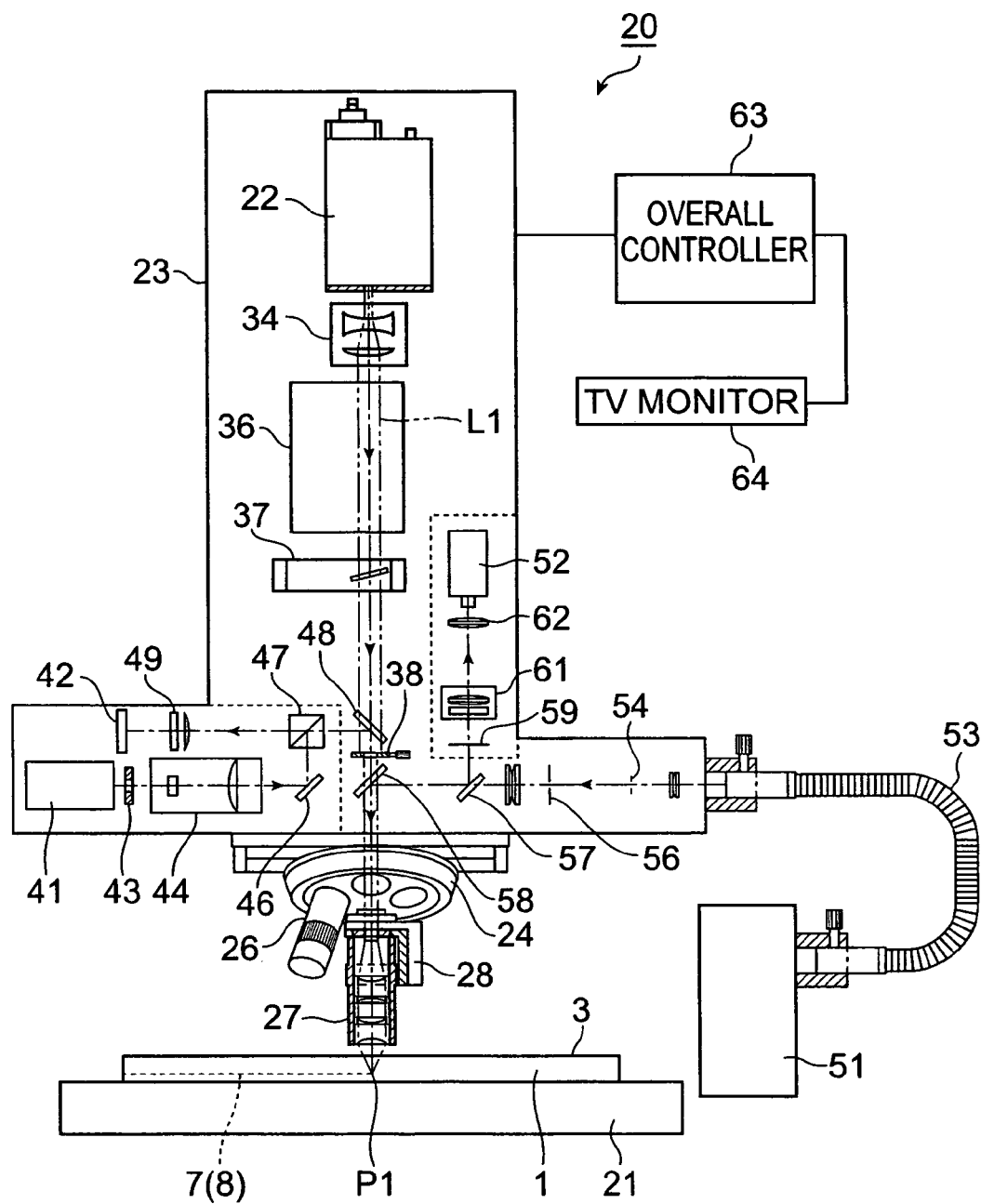
FIG. 14 is a schematic diagram of the laser processing apparatus in accordance with the embodiment.

As shown in FIG. 14, a laser processing apparatus 20 is an apparatus which irradiates a wafer-like object to be processed 1 with processing laser light L1 while locating a light-converging point P1 within the object 1, so as to form a modified region 7 by multiphoton absorption within the object 1, and causes the modified region 7 to form a part to cut 8 extending along the front face 3 of the object 1. Here, the object 1 is a semiconductor wafer such as silicon wafer, whereas the modified region 7 is a molten processed region.

The laser processing apparatus 20 includes a stage 21 on which the object 1 is mounted, whereas the stage 21 is movable along X, Y, and Z axes, where the Z axis extends vertically. Disposed above the stage 21 is a housing 23 accommodating a laser light source 22 for generating processing laser light L1 and the like. For example, the laser light source 22 is an Nd:YAG laser, and emits the processing laser light L1, which is pulsed laser light having a pulse width of 1 µm or less, to the object 1 on the stage 21 positioned just under the laser light source 22.

A powered revolver 24 is attached to the lower end face of the housing 23, and is mounted with an observation objective lens 26 and a processing objective lens 27 for converging the processing laser light L. As the powered revolver 24 revolves, the respective optical axes of the objective lenses 26, 27 are caused to align with the optical axis of the processing laser light L1. Between the processing objective lens 27 and the powered revolver 24, an actuator 28 using a piezoelectric device is interposed, whereby the position of the processing objective lens 27 is minutely adjusted along the Z axis (in vertical directions) by the actuator 28.

Figure 15:
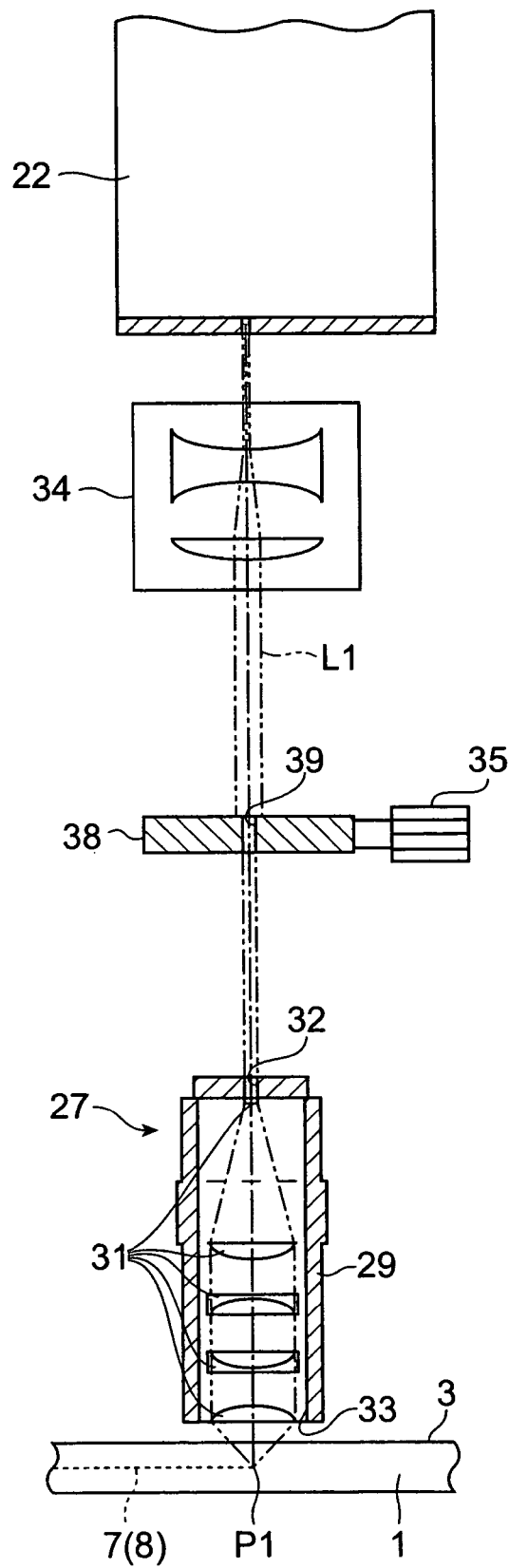
FIG. 15 is an enlarged view showing a major part of the laser processing apparatus shown in FIG. 14.

As shown in FIG. 15, the processing objective lens 27 includes a cylindrical lens holder 29, whereas the lens holder 29 holds therewithin a condenser lens 31 having a numerical aperture of "0.80" constituted by a plurality of lenses. A first light-transmitting hole 32 acting as an entrance pupil is formed at an upper end part of the lens holder 29, whereas an exit opening 33 for the processing laser light L1 is formed at a lower end part of the lens holder 29. Thus configured processing objective lens 27 converges the processing laser light L1, whereby the peak power density of the processing laser light L1 at the light-converging point P1 caused by the condenser lens 31 is $1\times10^8$ (W/cm$^2$) or greater.

On the optical axis of the processing laser light L1 within the housing 23, a beam expander 34 for enlarging the beam size of the laser light L1 generated in the laser light source 22, a laser light adjusting optical system 36 for adjusting the output and polarization of the laser light L1, an electromagnetic shutter 37 for passing or blocking the laser light L1, and a stop member 38 for narrowing the beam size of the laser light L1 are arranged successively from the upper side to the lower side in this order as shown in FIG. 14. The beam expander 34 emits the laser light L1 as substantially parallel light.

As shown in FIG. 15, the stop member 38 is attached to the housing 23 at a position above the first light-transmitting hole 32 of the processing objective lens 27, while having a second light-transmitting hole 39 as an aperture for narrowing and passing the laser light L1 on the optical axis of the processing laser light L1. The second light-transmitting hole 39 is formed with the same diameter as that of the first light-transmitting hole 32 of the processing objective lens 27, whereas the center axis of the second light-transmitting hole 39 can accurately be aligned with that of the first light-transmitting hole 32 by an adjustment screw 35 attached to the stop member 38. Therefore, in the processing laser light L1 having a beam size enlarged by the beam expander 34, the outer peripheral part greater than the second light-transmitting hole 39 is cut by the stop member 38, whereby the diameter of the processing laser light L1 transmitted through the second light-transmitting hole 39 equals that of the first light-transmitting hole 32 of the processing objective lens 27. When the laser light L1 emitted from the beam expander 34 is not completely parallel light but substantially parallel light which expands slightly, it will be sufficient if the diameter of the second light-transmitting hole 39 is made smaller than that of the first light-transmitting hole 32 such that the laser light is hardly incident on the surrounding part of the first light-transmitting hole 32 in view of the expansion of the laser light L1.

As shown in FIG. 14, in order for the distance between the processing objective lens 27 and the front face 3 of the object 1 to be always held constant during laser processing, the laser processing apparatus 20 further includes within the housing 23 a rangefinding light source 41 such as laser diode for generating rangefinding laser light and a quadrant position detecting device 42 into which a diode is equally divided into four.

Namely, the rangefinding laser light emitted from the rangefinding light source 41 successively passes a pinhole 43 and a beam expander 44, and then is successively reflected by a mirror 46 and a half mirror 47, so as to be guided to a dichroic mirror 48 disposed between the electromagnetic shutter 37 and the stop member 38. The rangefinding laser light reflected by the dichroic mirror 48 advances downward on the optical axis of the processing laser light L1, so as to pass the second light-transmitting hole 39 of the stop member 38, and then is converged by the condenser lens 31 of the processing objective lens 27, so as to irradiate the object 1. The processing laser light L1 is transmitted through the dichroic mirror 48.

The reflected light of rangefinding laser light reflected by the front face 3 of the object 1 is made incident on the condenser lens 31 of the processing objective lens 27 again, so as to advance upward on the optical axis of the processing laser light L1 and pass the second light-transmitting hole 39 of the stop member 38, and then is reflected by the dichroic mirror 48. The reflected light of the rangefinding laser light reflected by the dichroic mirror 48 passes through the half mirror 47, and then is converged by a shaping optical system 49 constituted by a cylindrical lens and a planoconvex lens, so as to irradiate the quadrant position detecting device 42.

The converged light image pattern of the rangefinding laser light on the quadrant position detecting device 42 varies depending on the distance between the processing objective lens 27 and the front face 3 of the object 1. This laser processing apparatus 20 feedback-controls the actuator 28 such that the distance between the processing objective lens 27 and the front face 3 of the object 1 becomes always constant during laser processing according to the converged light image pattern on the quadrant position detecting device 42, thereby minutely adjusting the position of the processing objective lens 27 along the vertical axis.

Further, for observing the object 1 mounted on the stage 21, the laser processing apparatus 20 has an observation light source 51 for generating observation visible light on the outside of the housing 23, and a CCD camera 52 within the housing 23.

Namely, the observation visible light emitted from the observation light source 51 is guided into the housing 23 by a lightguide 53 made of an optical fiber, so as to pass a field stop 54, an aperture stop 56, a dichroic mirror 57, and the like in succession, and then is reflected by a dichroic mirror 58 disposed between the stop member 38 and the first light-transmitting hole 32 of the processing objective lens 27. The reflected observation visible light advances downward on the optical axis of the processing laser light L1, and passes the observation objective lens 26 disposed on the optical axis of the processing laser light L1 as the powered revolver 24 revolves, so as to irradiate the object 1. The processing laser light L1, the rangefinding laser light, and its reflected light are transmitted through the dichroic mirror 58.

The reflected light of observation visible light reflected by the front face 3 of the object 1 is made incident on the observation objective lens 26 again, so as to advance upward on the optical axis of the processing laser light L1, and is reflected by the dichroic mirror 58. The light reflected by the dichroic mirror 58 is further reflected by the dichroic mirror 57, so as to pass a filter, an imaging lens 61, and a relay lens 62 in succession, thereby entering the CCD camera 52.

Imaging data captured by the CCD camera 52 are taken into an overall controller 63, whereby an image of the front face 3 of the object 1 or the like is displayed on a TV monitor 64 by the overall controller 63. The overall controller 63 executes various kinds of processing, and regulates not only the movement of the stage 21, rotation of the powered revolver 24, opening/closing of electromagnetic shutter 37, imaging by the CCD camera 52, and so forth, but also operations of the laser processing apparatus 20 as a whole.

A procedure of laser processing by the above-mentioned laser processing apparatus 20 will now be explained. First, the object 1 is mounted on the stage 21. Subsequently, the stage 21 is moved such that a position at which the forming of a modified region 7 in the object 1 is started coincides with the light-converging point P1 of processing laser light L1. The distance between the processing objective lens 27 and the front face 3 of the object 1 at this time can be determined according to the thickness and refractive index of the object 1.

Subsequently, the laser light source 22 is caused to emit the processing laser light L1 to the object 1. Since the light-converging point P1 is positioned at a predetermined distance inside from the front face 3 of the object 1 at that time, the modified region 7 is formed within the object 1. Then, the stage 21 is moved along a desirable line to cut along X and Y axes, so that a part to cut 8 extending along the front face 3 of the object 1 is formed by the modified region 7.

During the forming of the part to cut 8, the actuator 28 minutely adjusts the position of the processing objective lens 27 along the vertical axis such that the distance between the processing objective lens 27 and the front face 3 of the object 1 becomes constant according to the converged light image pattern of reflected light of rangefinding laser light on the quadrant position detecting device 42. Therefore, even when the front face 3 of the object 1 wobbles or the stage 21 vibrates, the distance between the processing objective lens 27 and the front face 3 of the object 1 is held constant. Hence, the part to cut 8 can accurately be formed at a predetermined distance inside from the front face 3 of the object 1.

In the laser processing apparatus 20, as explained in the foregoing, the stop member 38 provided with the second light-transmitting hole 39 having the same diameter as that of first light-transmitting hole 32 in the lens holder 29 is disposed on the optical path of the processing laser light L1 connecting the beam expander 34 and the first light-transmitting hole 32 to each other. Therefore, in the processing laser light L1 having a beam size enlarged by the beam expander 34, the outer peripheral part greater than the second light-transmitting hole 39 is cut by the stop member 38, whereby the diameter of the processing laser light L1 transmitted through the second light-transmitting hole 39 substantially equals that of the first light-transmitting hole 32 in the lens holder 29. Hence, the amount of laser light L1 cut by the surrounding part of the first light-transmitting hole 32 can substantially be eliminated, whereby the processing laser light L1 can be prevented from heating the lens holder 29.

Also, even when the stop member 38 is heated by the laser light L1 cut by the surrounding part of the second light-transmitting hole 39, heat is prevented from being transmitted from the stop member 38 to the lens holder 29, since the stop member 38 is separated from the lens holder 29. Therefore, the positional fluctuation in light-converging point P1 of processing laser light L1 mainly due to the heating of the lens holder 29 during laser processing can be suppressed to a low level, whereby the modified region 7 can be formed accurately at a predetermined position within the object 1.

Figure 16:
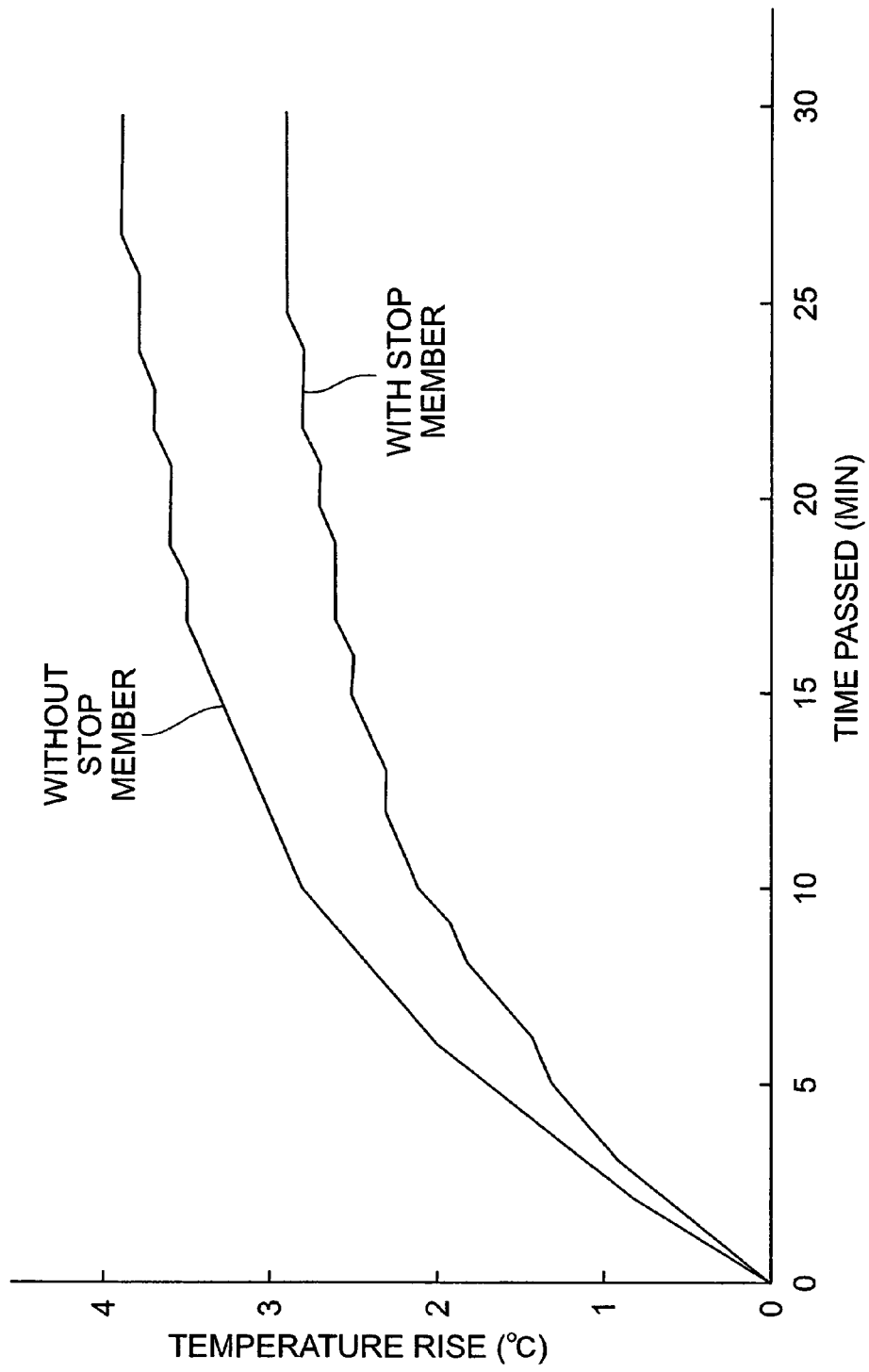
FIG. 16 is a graph showing relationships between the time passed after starting laser processing and the raised temperature in the laser processing apparatus shown in FIG. 14.

FIG. 16 is a graph showing relationships between the time passed after starting laser processing and the temperature rise in the lens holder. As shown in this graph, by providing the stop member 39, the laser processing apparatus 20 can lower the temperature rise in the lens holder 29 after 30 minutes from the starting of laser processing by as much as 1° C. when compared with the case without the stop member 39.

For generating multiphoton absorption within the object 1, the peak power density of processing laser light L1 at the light-converging point P1 is required to be high, e.g., $1 \times 10^8$ (W/cm$^2$) or higher, whereas the modified region 7 generated by multiphoton absorption is needed to be minute since the object 1 has a wafer form. For forming such a modified region 7, a condenser lens 31 having a large numerical aperture, e.g., "0.80", is required to be used, which makes it necessary to enlarge the entrance pupil diameter of the condenser lens 31, i.e., the diameter of the first light-transmitting hole 32. By providing the beam expander 34, the laser processing apparatus 20 can sufficiently enlarge the beam size of the processing laser light L1 generated by the laser light source 22, so as to make it correspond to the enlarged diameter of the first light-transmitting hole 32.

The laser processing apparatus in accordance with the present invention is not restricted to the above-mentioned embodiment. For example, the second light-transmitting hole 39 in the stop member 38 is not limited to those having the same diameter as that of the first light-transmitting hole 32 in the lens holder 29, but may have a diameter greater than that of the first light-transmitting hole 32 as long as it can narrow and transmit the processing laser light L1 having a beam size enlarged by the beam expander 34. The latter case can also reduce the amount of laser light L1 cut by the surrounding part of the first light-transmitting hole 32 as compared with the case where the processing laser light L1 enlarged by the beam expander 34 is directly emitted to the first light-transmitting hole 32, whereby the lens holder 29 can be restrained from being heated by the cut laser light L1.

Though the above-mentioned embodiment relates to a case where the laser light L1 emitted from the beam expander 34 is substantially parallel light, it may be divergent light or convergent light as well.

Figure 17:
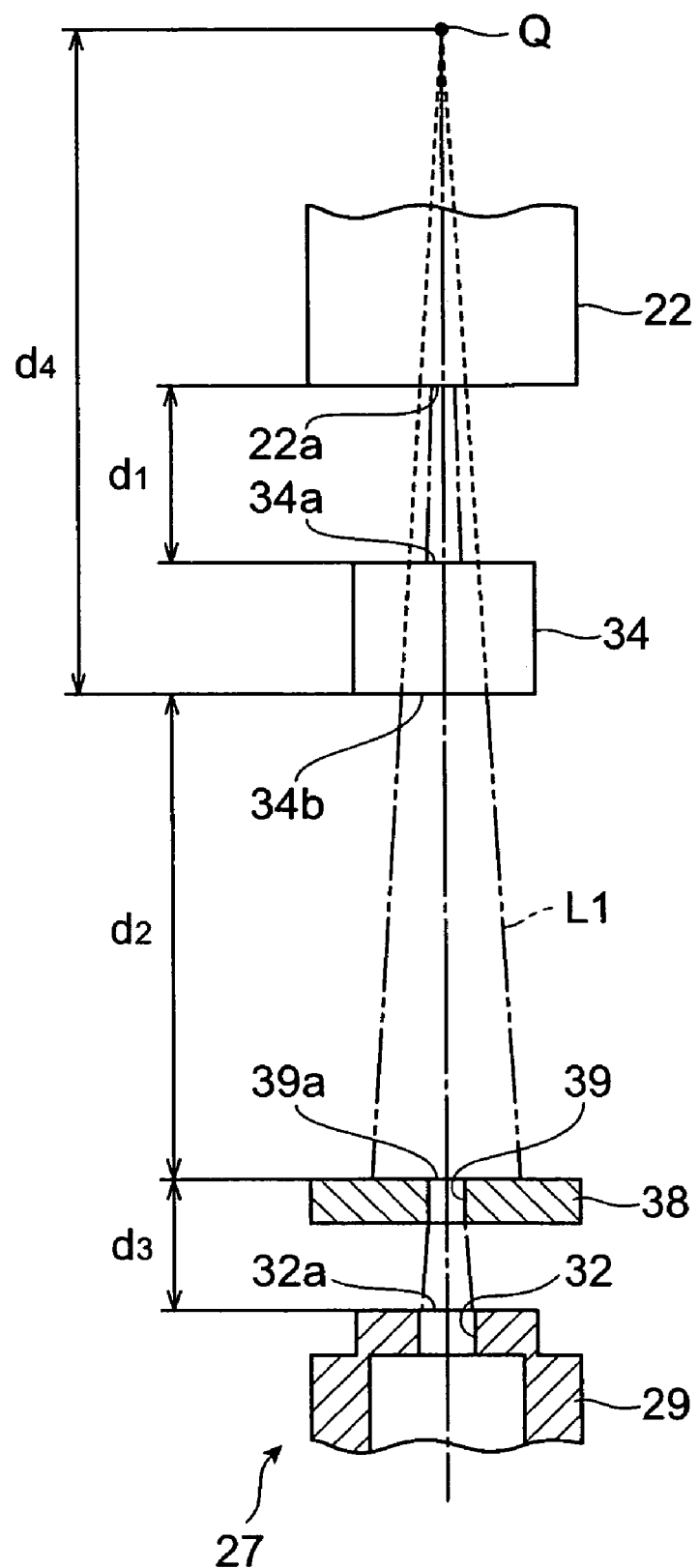
FIG. 17 is a schematic diagram showing a major part of the laser processing apparatus in a case where laser light emitted from the beam expander is divergent light.

First, a case where the laser light L1 emitted from the beam expander 34 is divergent light will be explained. Assume that the laser light source 22 emits the laser light L1 at a beam diameter $\phi_0$ and a divergence angle $2\theta_0$, and that the beam expander 34 enlarges the beam size of the laser light by a magnification M and emits the laser light L1 at a divergence angle $2\theta_1$. Also, as shown in FIG. 17, suppose that $d_1$ is the distance between the exit part 22a of the laser light source 22 and the entrance part 34a of the beam expander 34, $d_2$ is the distance between the exit part 34b of the beam expander 34 and the entrance opening 39a of the second light-transmitting hole 39, and $d_3$ is the distance between the entrance opening 39a of the second light-transmitting hole 39 and the entrance opening 32a of the first light-transmitting hole 32.

Here, the beam diameter of the laser light L1 at the entrance part 34a of the beam expander 34 is "$\phi_0 + 2d_1 \cdot \tan \theta_0$", whereby the beam diameter $\phi_1$ of the laser light L1 at the exit part 34b of the beam expander 34 is represented by the following expression (1):

$$\phi_1 = M(\phi_0 + 2d_1 \cdot \tan\theta_0) \quad (1)$$

Assuming that there is no beam expander 34 here, the distance $d_4$ between a virtual point light source position Q which emits the laser light L1 attaining a beam diameter $\phi_1$ and a divergence angle $2\theta_1$ at the position of the exit part 34b of the beam expander 34 and the exit part 34b of the beam expander 34 is represented by the following expression (2):

$$d_4 = \phi_1/(2\cdot\tan\theta_1) \quad (2)$$

When the laser light L1 is supposed to be emitted with the divergence angle $2\theta_1$ from the virtual point light source position Q, the light beam angle $2\theta_L$ entering the entrance opening 32a of the first light-transmitting hole 32 positioned at the distance "$d_4+d_2+d_3$" from the virtual point light source position Q is represented by the following expression (3):

$$2\theta_L = 2\cdot\tan^{-1}\{\phi_L/2(d_4+d_2+d_3)\} \quad (3)$$

where $\phi_L$ is the diameter of the first light-transmitting hole 32.

Therefore, letting $\phi_S$ be the diameter of the second light-transmitting hole 39, the laser light L1 can substantially be kept from being incident on the surrounding part of the first light-transmitting hole 32 if the diameter $\phi_S$ of the second light-transmitting hole 39 is defined by the following expression (4) so that only the laser light L1 having a light beam angle of $2\theta_L$ or less is transmitted therethrough:

$$2(d_4+d_2)\tan\theta_L \geq \phi_S \quad (4)$$

When $\theta_1$, $d_4$, and $\theta_L$ are eliminated from the above-mentioned expressions (1) to (4), the diameter $\phi_L$ of the first light-transmitting hole 32 and the diameter $\phi_S$ of the second light-transmitting hole 39 satisfy the relationship of $$\frac{\phi_L\{M(\phi_0 + 2d_1\tan\theta_0) + 2d_2\tan\theta_1\}}{M(\phi_0 + 2d_1\tan\theta_0) + 2(d_2+d_3)\tan\theta_1} \geq \phi_S.$$

When the laser light L1 emitted from the beam expander 34 is divergent light, the laser light L1 incident on the surrounding part of the first light-transmitting hole 32 can substantially be eliminated if the diameter $\phi_L$ of the first light-transmitting hole 32 and the diameter $\phi_S$ of the second light-transmitting hole 39 satisfy the above-mentioned relationship as in the foregoing. Therefore, the amount of laser light L1 cut by the surrounding part of the first light-transmitting hole 32 can substantially be eliminated, whereby the heating of the lens holder 29 can further be suppressed.

Figure 18:
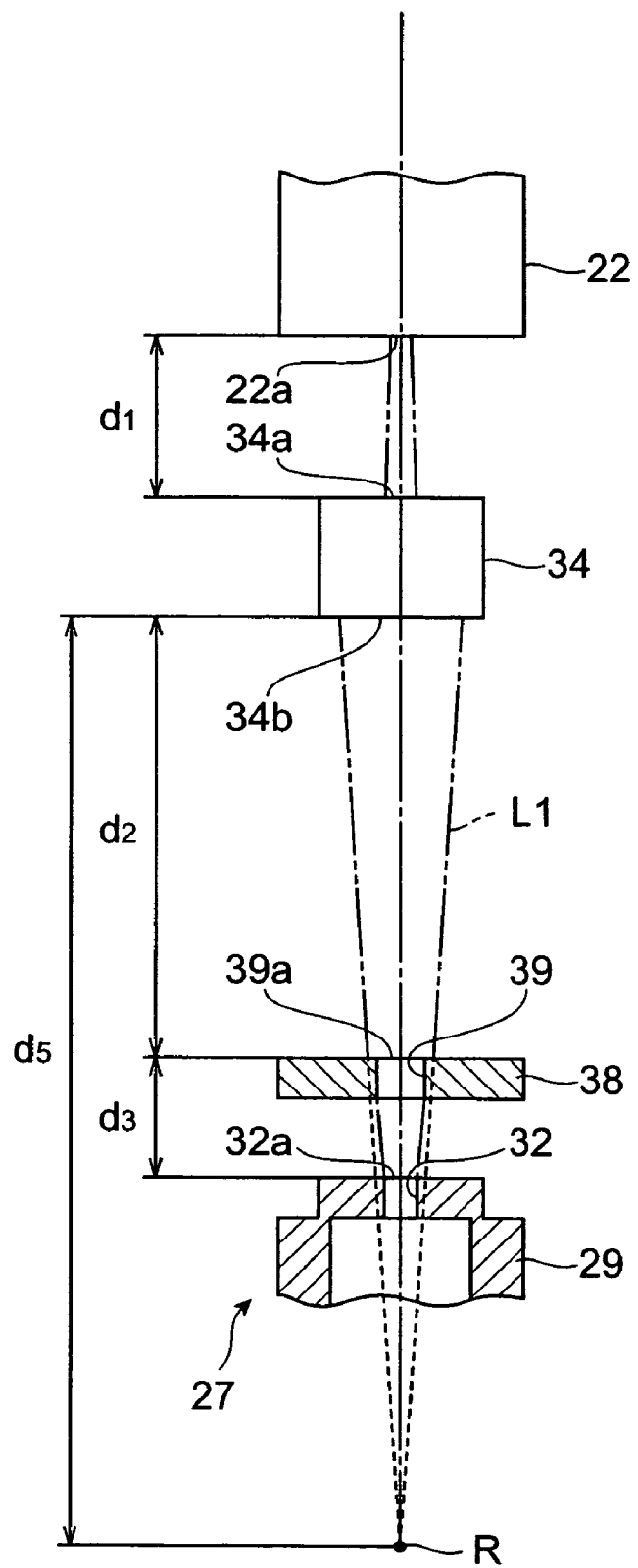
FIG. 18 is a schematic diagram showing a major part of the laser processing apparatus m a case where laser light emitted from the beam expander is convergent light.

Next, a case where the laser light L1 emitted from the beam expander 34 is convergent light will be explained. Assume that the laser light source 22 emits the laser light L1 at a beam diameter $\phi_0$ and a divergence angle $2\theta_0$, and that the beam expander 34 enlarges the beam size of the laser light by a magnification M and emits the laser light L1 at a convergence angle $2\theta_1$. Also, as shown in FIG. 18, suppose that $d_1$ is the distance between the exit part 22a of the laser light source 22 and the entrance part 34a of the beam expander 34, $d_2$ is the distance between the exit part 34b of the beam expander 34 and the entrance opening 39a of the second light-transmitting hole 39, and $d_3$ is the distance between the entrance opening 39a of the second light-transmitting hole 39 and the entrance opening 32a of the first light-transmitting hole 32.

Here, the beam diameter of the laser light L1 at the entrance part 34a of the beam expander 34 is "$\phi_0 + 2d_1\cdot\tan\theta_0$", whereby the beam diameter $\phi_1$ of the laser light L1 at the exit part 34b of the beam expander 34 is represented by the following expression (5):

$$\phi_1 = M(\phi_0 + 2d_1\cdot\tan\theta_0) \quad (5)$$

Assuming that the laser light L1 yielding the beam diameter $\phi_1$ and the convergence angle $2\theta_1$, is converged at the position of the exit part 34b of the beam expander 34, the distance $d_5$ between the virtual light-converging point position R and the exit part 34b of the beam expander 34 is represented by the following expression (6):

$$d_5 = \phi_1/(2\cdot\tan\theta_1) \quad (6)$$

In the laser light converged with the convergence angle $2\theta_1$ at the virtual light-converging point position R, the light beam angle $2\theta_L$ entering the entrance opening 32a of the first light-transmitting hole 32 positioned at the distance "$d_5-(d_2+d_3)$" from the virtual light-converging point position R is represented by the following expression (7):

$$2\theta_L = 2\cdot\tan^{-1}[\phi_L/2\{d_5-(d_2+d_3)\}] \quad (7)$$

where $\phi_L$ is the diameter of the first light-transmitting hole 32.

Therefore, letting $\phi_S$ be the diameter of the second light-transmitting hole 39, the laser light L1 can substantially be kept from being incident on the surrounding part of the first light-transmitting hole 32 if the diameter $\phi_S$ of the second light-transmitting hole 39 is defined by the following expression (8) so that only the laser light L1 having a light beam angle of $2\theta_L$ or less is transmitted therethrough:

$$\phi_L + 2d_3\cdot\tan\theta_L \geq \phi_S \quad (8)$$

When $\theta_1$, $d_5$, and $\theta_L$ are eliminated from the above-mentioned expressions (5) to (8), the diameter $\phi_L$ of the first light-transmitting hole 32 and the diameter $\phi_S$ of the second light-transmitting hole 39 satisfy the relationship of $$\frac{\phi_L\{M(\phi_0 + 2d_1\tan\theta_0) - 2d_2\tan\theta_1\}}{M(\phi_0 + 2d_1\tan\theta_0) - 2(d_2+d_3)\tan\theta_1} \geq \phi_S.$$

When the laser light L1 emitted from the beam expander 34 is convergent light, the laser light L1 incident on the surrounding part of the first light-transmitting hole 32 can substantially be eliminated if the diameter $\phi_L$ of the first light-transmitting hole 32 and the diameter $\phi_S$ of the second light-transmitting hole 39 satisfy the relationship as in the foregoing. Therefore, the amount of laser light L1 cut by the surrounding part of the first light-transmitting hole 32 can substantially be eliminated, whereby the heating of the lens holder 29 can further be suppressed.

INDUSTRIAL APPLICABILITY

As explained in the foregoing, the laser processing apparatus in accordance with the present invention can suppress the positional fluctuation in light-converging point of laser light mainly due to the heating of the lens holder during laser processing to a low level, thereby making it possible to form a modified region accurately at a predetermined position within a wafer-like object to be processed.

The invention claimed is:

1. A laser processing apparatus for irradiating a wafer-like object to be processed with laser light while locating a light-converging point within the object so as to form a modified region by multiphoton absorption within the object, the apparatus comprising:

a beam expander for enlarging a beam size of the laser light emitted from a laser light source;

a condenser lens for converging the laser light incident thereon by way of the beam expander into the object; and a lens holder holding the condenser lens and including a first light-transmitting hole for making the laser light incident on the condenser lens;

wherein a stop member having a second light-transmitting hole for narrowing and transmitting the laser light is disposed on an optical path of the laser light connecting the beam expander and the first light-transmitting hole to each other and is separated from the lens holder.

2. A laser processing apparatus according to claim 1, wherein, when the laser light emitted from the beam expander is substantially parallel light, the second light-transmitting hole has a diameter not greater than that of the first light-transmitting hole.

3. A laser processing apparatus according to claim 1, wherein, when the laser light source emits the laser light at a beam diameter $\phi_0$ and a divergence angle $2\theta_0$, and the beam expander enlarges the beam size of the laser light by a magnification M and emits the laser light at a divergence angle $2\theta_1$;

assuming that $d_1$ is the distance between an exit part of the laser light source and an entrance part of the beam expander, $d_2$ is the distance between an exit part of the beam expander and an entrance opening of the second light-transmitting hole, and $d_3$ is the distance between the entrance opening of the second light-transmitting hole and an entrance opening of the first light-transmitting hole; and letting $\phi_L$ be the diameter of the first light-transmitting hole, and $\phi_S$ be the diameter of the second light-transmitting hole;

($\phi_L$ and $\phi_S$ satisfy the relationship of $$\frac{\phi_L\{M(\phi_0 + 2d_1\tan\theta_0) + 2d_2\tan\theta_1\}}{M(\phi_0 + 2d_1\tan\theta_0) + 2(d_2 + d_3)\tan\theta_1} \geq \phi_s.$$

4. A laser processing apparatus according to claim 1, wherein, when the laser light source emits the laser light at a beam diameter $\phi_0$ and a divergence angle $2\theta_0$, and the beam expander enlarges the beam size of the laser light by a magnification M and emits the laser light at a convergence angle $2\theta_1$;

assuming that $d_1$ is the distance between an exit part of the laser light source and an entrance part of the beam expander, $d_2$ is the distance between an exit part of the beam expander and an entrance opening of the second light-transmitting hole, and $d_3$ is the distance between the entrance opening of the second light-transmitting hole and an entrance opening of the first light-transmitting hole; and $\phi_L$ be the diameter of the first light-transmitting hole, and $\phi_S$ be the diameter of the second light-transmitting hole;

$\phi_L$ and $\phi_S$ satisfy the relationship of $$\frac{\phi_L\{M(\phi_0 + 2d_1\tan\theta_0) - 2d_2\tan\theta_1\}}{M(\phi_0 + 2d_1\tan\theta_0) - 2(d_2 + d_3)\tan\theta_1} \geq \phi_s.$$

5. A laser processing apparatus for irradiating a wafer-like object to be processed with laser light while locating a light-converging point within the object so as to form a modified region within the object, the apparatus comprising:

a beam expander for enlarging a beam size of the laser light emitted from a laser light source;

a condenser lens for converging the laser light incident thereon by way of the beam expander into the object; and a lens holder holding the condenser lens and including a first light-transmitting hole for making the laser light incident on the condenser lens;

wherein a stop member having a second light-transmitting hole for narrowing and transmitting the laser light is disposed on an optical path of the laser light connecting the beam expander and the first light-transmitting hole to each other and is separated from the lens holder.

* * * * *